United States Patent
De Muelenaere et al.

(10) Patent No.: US 8,786,918 B2
(45) Date of Patent: Jul. 22, 2014

(54) AUTONOMOUS PORTABLE SCANNERS

(75) Inventors: Pierre De Muelenaere, Court-Saint-Etienne (BE); Michel Dauw, Machelen (BE); Olivier Dupont, Sombreffe (BE); Patrick Verleysen, Wavre (BE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

(21) Appl. No.: 13/587,909

(22) Filed: Aug. 16, 2012

(65) Prior Publication Data

US 2012/0307316 A1 Dec. 6, 2012

Related U.S. Application Data

(63) Continuation-in-part of application No. 13/023,666, filed on Feb. 9, 2011.

(30) Foreign Application Priority Data

Aug. 16, 2011 (BE) .................................. 2011/0498

(51) Int. Cl.
  *H04N 1/024* (2006.01)
  *H04N 1/04* (2006.01)
  *H04N 1/40* (2006.01)
  *G06F 15/173* (2006.01)
  *G06F 15/16* (2006.01)
  *H03L 7/00* (2006.01)

(52) U.S. Cl.
  USPC .......... 358/498; 358/473; 358/472; 358/474; 358/444; 358/470; 709/226; 709/202; 709/203; 705/14.1; 348/536

(58) Field of Classification Search
  USPC .......... 358/473, 472, 501, 498, 474; 348/536
  See application file for complete search history.

(56) References Cited

U.S. PATENT DOCUMENTS

| | | | |
|---|---|---|---|
| 5,278,673 A * | 1/1994 | Scapa et al. .................... | 358/473 |
| 6,031,636 A | 2/2000 | Chen | |
| 7,836,183 B1 * | 11/2010 | Barnett et al. ................ | 709/226 |
| 2002/0169509 A1 | 11/2002 | Huang et al. | |
| 2004/0090651 A1 * | 5/2004 | Kang et al. .................... | 358/1.16 |
| 2005/0225810 A1 * | 10/2005 | Sun ............... | 358/474 |
| 2005/0286091 A1 * | 12/2005 | Harel et al. .................. | 358/474 |
| 2006/0001920 A1 * | 1/2006 | Moreno et al. ................ | 358/498 |
| 2006/0103893 A1 * | 5/2006 | Azimi et al. ................... | 358/474 |
| 2007/0195378 A1 * | 8/2007 | Yoshida ...................... | 358/470 |
| 2009/0009829 A1 * | 1/2009 | Katsuyama ................... | 358/498 |
| 2010/0031173 A1 | 2/2010 | Djemal | |
| 2010/0091341 A1 | 4/2010 | Ruskin et al. | |

* cited by examiner

*Primary Examiner* — Akwasi M Sarpong
(74) *Attorney, Agent, or Firm* — Jerold I. Schneider; Schneider Rothman IP Law Group

(57) ABSTRACT

Battery-powered portable scanner, comprising: a scanning unit for scanning documents and forming digital representations thereof; a processor, communicatively connected to the scanning unit and provided for controlling the scanning operation; at least a first embedded storage capabilities, each of which is communicatively connected to the processor and each of which comprises either an internal memory for internally storing the digital representations or a communication link to an external storage medium for externally storing the digital representations. The processor is provided for enabling autonomous operation without connection to a terminal. The processor may be provided with an embedded routing application which is provided for routing the digital representations to a predetermined selection among the embedded storage capabilities.

16 Claims, 11 Drawing Sheets

AUTONOMOUS PORTABLE SCANNERS

CROSS-REFERENCE TO RELATED APPLICATIONS

This application is a Continuation-In-Part of U.S. application Ser. No. 13/023,666 filed Feb. 9, 2011, which claims the benefit of Belgian Application No. BE2011/0498 filed Aug. 16, 2011 and Belgian Application No. BE2010/0067 filed Feb. 9, 2010, the entirety of each of which are hereby incorporated by reference.

TECHNICAL FIELD

This invention relates to autonomous portable scanners, e.g. a portable sheet-fed scanner or a hand-held scanner, and their use.

BACKGROUND ART

A scanner is a device connected to a computer that converts a document into a digital image that is transferred to the computer. The most common scanner is the flatbed scanner where the document is placed on a glass window for scanning, but there exist also other scanners such as the sheet-fed scanner and the hand-held scanner.

With the sheet-fed scanners, the document is carried along by a motor, like in the case of a fax machine. It is the document that moves and not the sensors or the glass pane. The advantages of sheet-fed scanners are their compactness and portability. Examples of sheet-fed scanners are the IRIScan™ and IRISCard™ developed and commercialized by I.R.I.S. SA.

The IRIScan™ is a compact and light-weight scanner able to scan A4 pages in color. It is connected to a computer through an USB cable. It comes with a text recognition software (runs on the computer, not on the scanner) that allows to convert the image of the scanned document into a file readable by a word-processor (e.g. Microsoft Word) or a file intended for archiving (e.g. the PDF format of Adobe).

The IRISCard™ is a compact and light-weight scanner able to scan business cards in color. It is connected to a computer through an USB cable. It comes with a business card recognition software (runs on the computer, not on the scanner) that captures the information they contain and creates electronic contacts to be sent to a contact manager, such as Microsoft Outlook.

A hand-held scanner is of smaller size than a sheet-fed scanner, so is particularly portable. A hand-held scanner has to be manually moved over the document. Contrary to a sheet-fed scanner, it makes it possible to digitalize books or other documents of which the pages are attached to each other. A hand-held scanner does not have a motor so that it has only a limited energy consumption.

In order to function, these types of scanners have to be connected to a running computer, through a cable or by means of a wireless technology.

DISCLOSURE OF THE INVENTION

It is an aim of the invention to present a portable scanner, such as a sheet-fed scanner or a hand-held scanner, which does not show at least one drawback of the prior art.

This aim is achieved with the scanner showing the technical features of the first claim.

The scanner of the invention is battery powered and has embedded storage capabilities. It comprises, for example, internal memory (such as flash memory) and/or connects to at least one external and/or removable memory (such as SD cards, USB stick, Bluetooth or Wi-Fi link to standalone or network drive). The scanner of the invention has a processor which is provided with an embedded routing application, i.e. in a format executable on the processor of the scanner itself, which has software code portions provided for routing the digital representations to a predetermined selection among the embedded storage capabilities. This allows to use the scanner as an autonomous device (no computer and no power cable required) and to store the documents in these different internal or removable memories according to predetermined settings.

In preferred embodiments, the scanner of the invention also allows to transfer the images to any kind of computer, independently of the Operating System, or mobile terminal, such as for example a PDA, smartphone or touchscreen tablet by:
  selecting the appropriate storage medium which is recognizable by the computer or mobile terminal,
  connecting/associating the medium to the scanner,
  scanning and storing the documents on that medium connected/associated with the scanner,
  importing the scanned documents stored on the medium into the computer, e.g. by removing the USB stick/SD card or micro SD card from the scanner and connecting it to the computer or mobile terminal, or by linking the computer to the network storage media, or by establishing a wireless connection, for example Bluetooth, which makes it possible to transfer the digitalized documents stored on the medium to the computer or mobile terminal.

With this process, it is no longer necessary to have a computer to scan, and it is not necessary to transport the computer or even to transport the scanner. It is sufficient to transport the removable storage or to establish a Bluetooth connection between the scanner and the computer or mobile terminal. Also, it is possible to select the appropriate storage media which corresponds best to the target computer and the target Operating System.

Furthermore, in case a hand-held scanner and a mobile terminal are available, the images of the digitalized documents can be transmitted from the scanner to the mobile terminal. A mobile terminal generally does not have a master USB connector, so that the image transfer cannot be done via a USB connection. On the contrary, a mobile terminal generally comprises a Bluetooth transceiver. It is thus interesting to have a portable hand-held scanner which also comprises a Bluetooth transceiver in view of being able to transfer the digitalized documents to the mobile terminal. If a storage medium can be connected to the mobile terminal, the image transfer can also be done by moving the medium from the scanner to the mobile terminal.

In preferred embodiments, the scanner has a connector or cavity for receiving an external micro SD card. If the user connects a memory card to this connector, its content can be accessed through a standard USB connection or a Bluetooth wireless connection.

In preferred embodiments, the external micro SC card is organized in different folders and the user can select in which folder the digitalized image is to be stored.

In preferred embodiments, the scanner comprises an internal storage (such as for example a flash memory) that can be accessed through a standard USB connection or wireless connection (Wifi or Bluetooth), an external SD Card (or micro SD Card) slot or USB slots for connecting USB memory sticks.

Also in preferred embodiments, a wireless connection capability is integrated in the device, to replace for example the USB connection to the target computer by a wireless connection.

In a preferred embodiment, the connection can be through a Bluetooth or a Wi-Fi connection.

In preferred embodiments, an application is embedded in the scanner which comprises software code portions, in a format executable by the processor of the scanner, provided for sorting the scanned documents at the time of scanning and storing different types of documents in different folders or on different storage media. This makes it possible that the user scans documents for different persons without mixing them up, or scans different types of documents (e.g. business cards and invoices) without mixing them up, as the sorting application detects the person or the document type and thereupon stores the images of the scanned documents in different folders or on different storage media, according to preferences/user settings. The ultimate goal is to be able to store different kinds of documents in different folders or on different storage media and to deliver these different kinds of documents to different people.

This sorting operation performed on the scanner device itself can be done according to simple or complex rules. One example of a simple rule is assigning a priority to each storage device. For instance, the memory stick can have the highest priority, then the SD card, then the internal flash memory. So when all the storage devices are connected, all documents are sent to the memory stick, if not, the documents are sent to the SD-Card and if no removable storage is connected to the scanner, all documents are sent to the internal flash memory of the scanner. There can be more complex rules based on the size of the scanned documents or based on properties and content of the documents, by using automatic identification technologies (such as the Fingerprint™ technology from I.R.I.S. SA) or other.

One typical example of such a sorting application is to store all scanned business cards on one memory to be later processed on a PC, all scanned professional letters on another memory to be later processed on a Macintosh, all scanned pictures on another medium to be downloaded to a photo-frame and to store scanned invoices on yet another storage medium, e.g. transferred by Bluetooth to a Smartphone.

In preferred embodiments, the processor is provided with an application to perform document hyper compression (for example such as the hyper compression described in US2008273807 A1, incorporated herein by reference in its entirety) and/or OCR to the scanned documents and to generate sophisticated document formats (such as for example PDF or XPS) which contain both the image and the text. This can then be performed on the scanner itself, i.e. independent from a computer or any computer Operating System.

In a first preferred embodiment, the scanner is equipped with a microcomputer able to run embedded programs for performing document hyper compression, OCR and/or PDF generation, during the scanning or just after the scanning, and storing the compressed file and an OCR result in one of the available storage capabilities.

In another preferred embodiment this process can be performed in a transparent way on the computer at the time the removable storage is connected to the computer or mobile terminal.

The invention further relates to a computer system comprising a scanner according to one of the above described embodiments in combination with a terminal having a document scanning application (e.g. OCR, Business card reading, document management, invoice recognition software, or other), provided for being executed on the terminal and comprising wake up capabilities for detecting when a removable storage medium that contains documents scanned with the portable scanner is connected to the terminal. The wake up capabilities are provided for starting pre-defined operations upon loading them from the removable storage medium into e.g. an internal storage medium of the terminal, such as for example additional processing (e.g. hyper compression, image enhancement, . . . ) of the images, user interactions (e.g. manual selection of document types, additional indexing of documents, additional processing of portions of the documents, . . . ). These operations can be fully performed by the document scanning application (so without user interaction), or can be user assisted.

In a preferred embodiment, all the documents on the media storage are stored in a way that clearly identifies how they have been stored (for instance, the storage location on the scanner which is indicated with a special folder name) and/or the type of documents that was scanned (document or business card, identified with different document prefix names or different tags in the files) and/or the processing that was done on the scanner (for instance with tags or meta-data in the files).

The document scanning application is preferably provided with capabilities to watch the different removable storage locations of the terminal and to interpret and recognize tags of the documents and the images that were generated by the scanner. This means that the document scanning application is capable of retrieving which processing steps have been performed on the scanner in a remote location and continuing the processing with knowledge of all the processing steps already performed.

In preferred embodiments of the scanner, the operation is provided with preferences/parameters/settings with which the images and/or documents generated by the portable scanner can be optimized in view of reaching a suitable compromise between speed, storage space and document quality.

DETAILED DESCRIPTION OF EMBODIMENTS

With reference to FIGS. 1-7, embodiments of a sheet-fed scanner according to the invention will be described.

Figure 1:
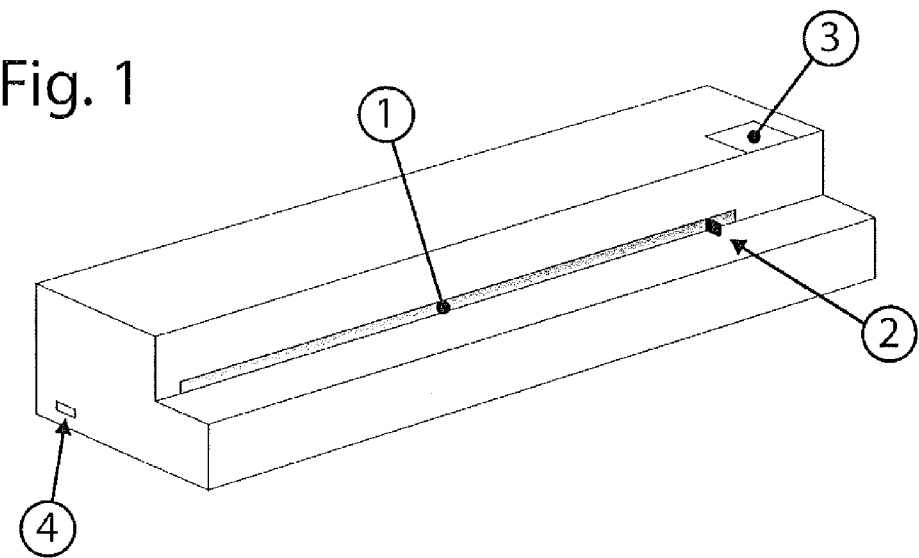
FIG. 1 shows an external view of a sheet-fed scanner of the present invention.
Figure 2:
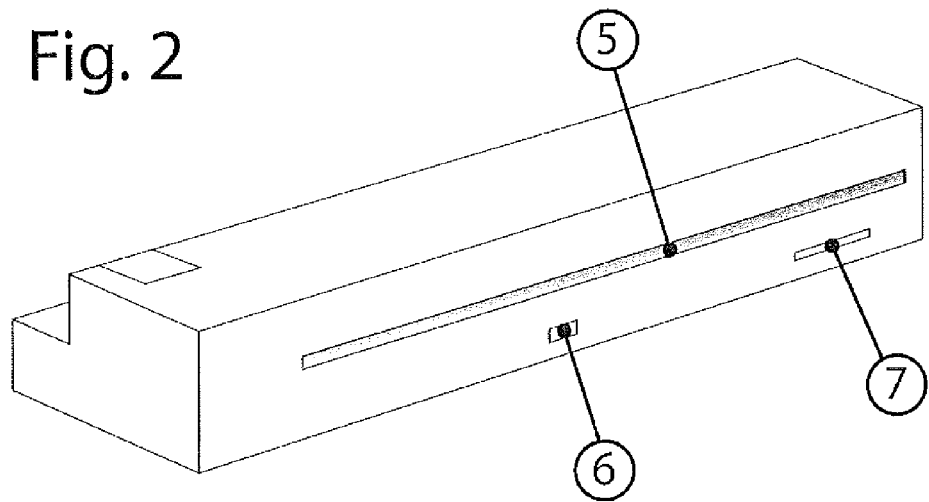
FIG. 2 shows the connections on the rear side of this scanner.

FIG. 1 shows an external view of a sheet-fed scanner of the present invention and FIG. 2 shows the connections on the rear side of the scanner. The scanner has a Power ON/OFF button and Operating status indicators (3). The scanner has to be Powered ON to be in operation. The user has to feed the paper of the document he wants to scan into the Document feeding slot (1). A sensor senses the presence of the paper and the paper is carried along by the scanner motor. The page is scanned line by line by Contact Image Sensors (CIS), converted into a digital image, compressed and transmitted to the scanner internal memory. The paper is output through the Document output slot (5). A paper guide (2) may be adjusted to the paper dimension in order that the paper doesn't skew during the scanning. The user may scan multiple pages that will be stored in the local memory. In the preferred embodiment, the local memory has a capacity of 512 Mbytes. That allows the storage of about 400 A4 pages. The scanner can be also connected to a computer through the USB connector to host (4). The computer will then mount automatically the scanner local memory as a standard memory device (removable disk) and the image files can be accessed. Note that no specific device driver has to be installed on the computer beforehand and so the image files can be accessed by computers having different Operating Systems (Windows, Macintosh, Unix, Linux, . . . ). The scanner is equipped with a battery that gives the power. This battery is charged by the Power charge connector (4) coupled with the USB connector to host. The battery can have a capacity which allows to scan more than 100 A4 pages without recharging. When an USB memory stick is inserted into the USB memory connector (6), the compressed image is not stored into the local memory but in the USB memory stick. When an SD/xD/MMC/MS memory card is inserted into the card connector (7), the compressed image is not stored into the local memory (or connected USB memory stick) but in the SD/xD/MMC/MS memory card.

When the scanner power is on, the power button can also be used to change the scanning resolution.

The operating status indicators have lightning patterns that indicate that:

The scanner is power ON or OFF.

The battery is charged, being charged or the battery power is low.

The scanner is ready or busy scanning and storing image file.

The local memory (or USB memory stick, or memory card) has free space or is nearly full.

Figure 3:
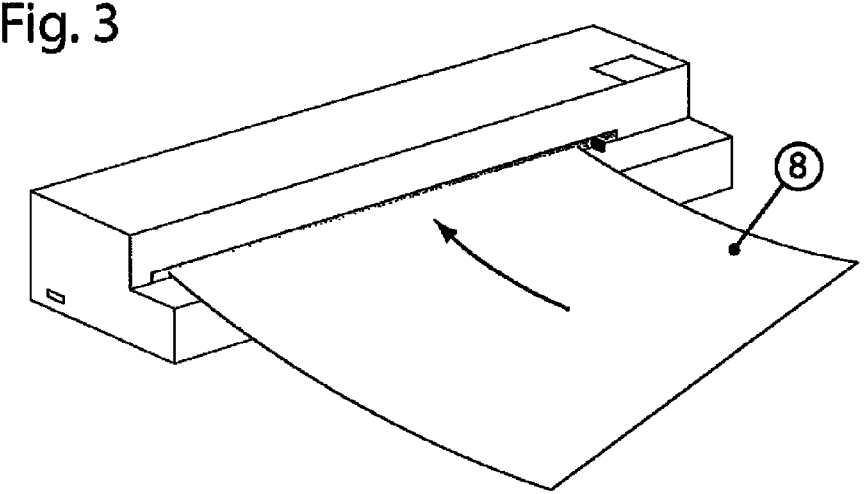
FIG. 3 shows the scanning of a document page.
Figure 4:
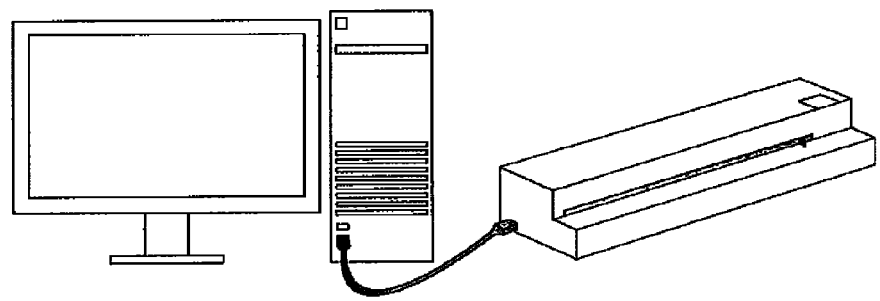
FIG. 4 shows the transmission of the scanned images stored in the scanner local memory by using an USB cable.

FIG. 3 shows the scanning of a document page (8) without a computer connected. The user may take his scanner with him while travelling and scanned several documents he is interested in. Back home, he can connect his scanner to his computer and process the scanned documents (FIG. 4).

Figure 5:
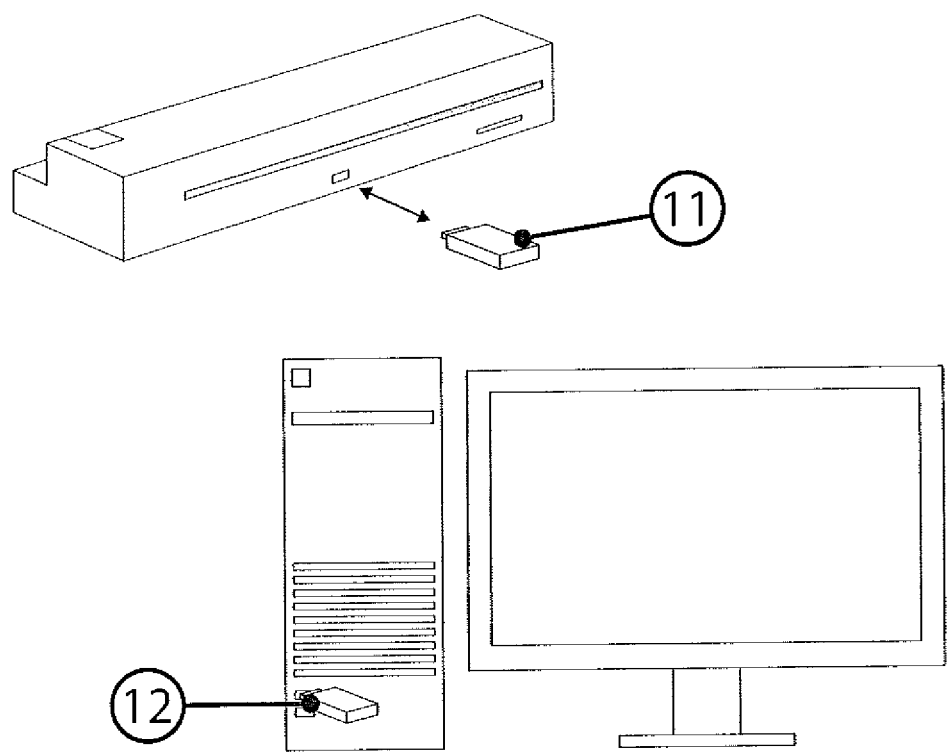
FIG. 5 shows the transmission of the scanned images by means of an USB memory stick.

The user may also use the scanner by inserting his USB memory stick into the scanner (11). He can scan several documents, store them on the USB stick and take back only the USB memory stick to a computer (12), where he inserts the USB stick for processing, storing or archiving the scanned documents (FIG. 5).

Figure 6:
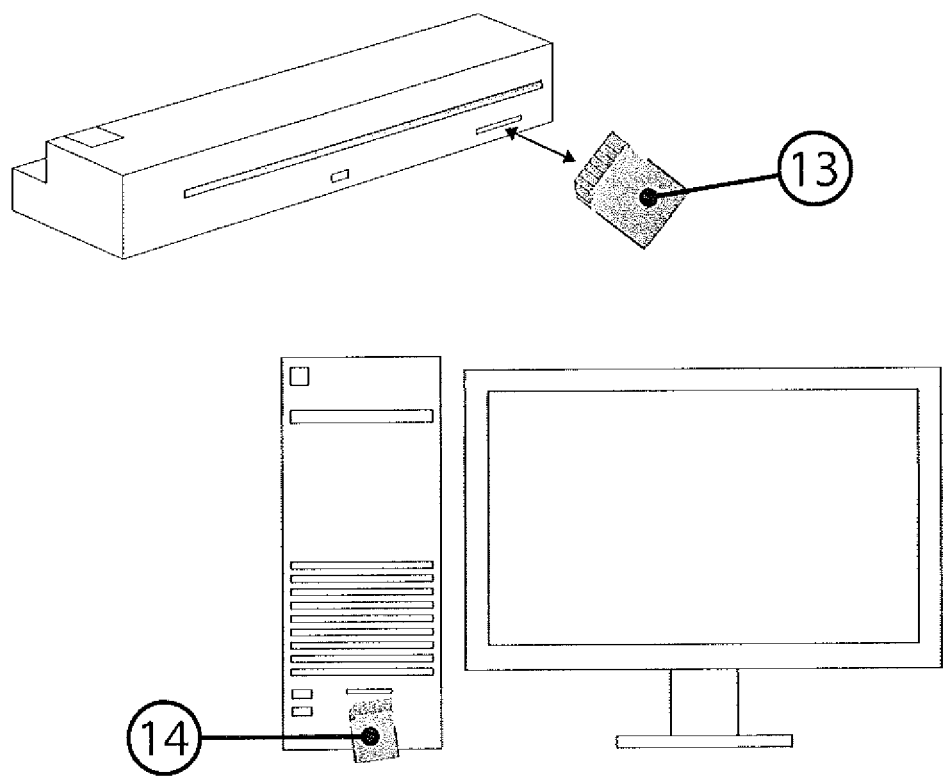
FIG. 6 shows the transmission of the scanned images by means of an SD card.

The user may also use the scanner by inserting his memory card into the scanner (13). He can scan several documents, store them on the memory card and take back only the memory card to a computer (14), where he inserts the memory card for processing, storing or archiving the scanned documents (FIG. 6).

Figure 7:
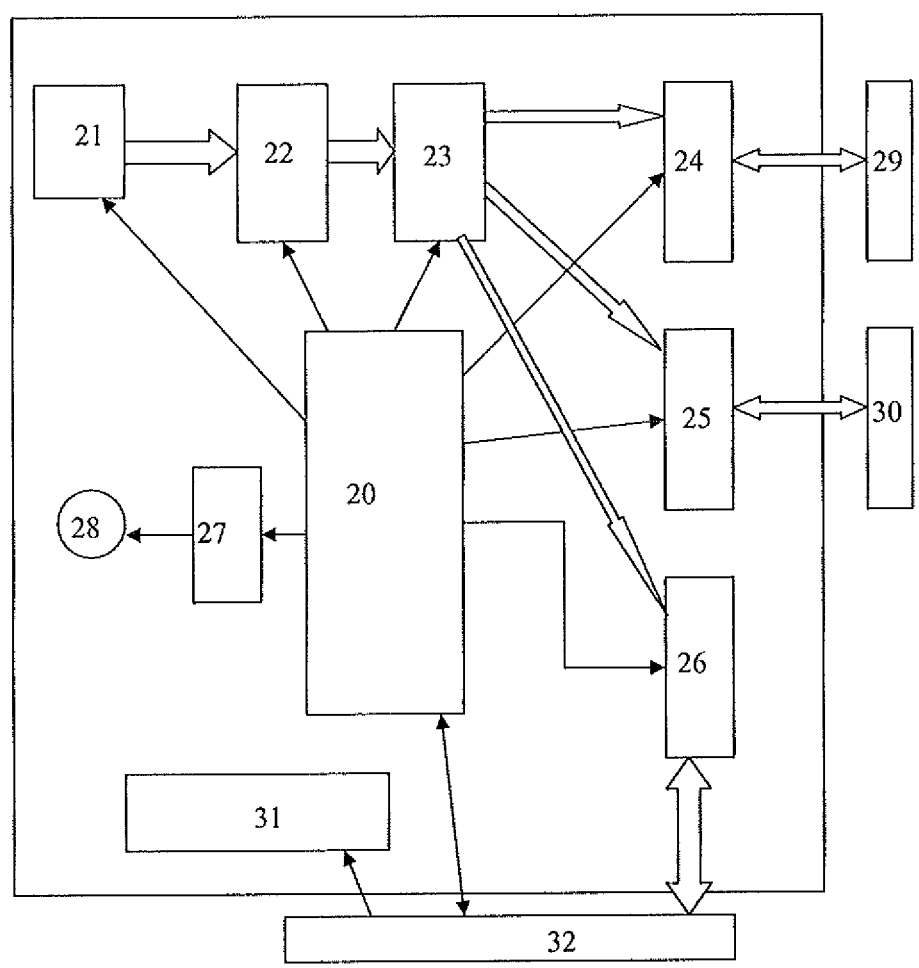
FIG. 7 shows a function block diagram of the sheet-fed scanner.

FIG. 7 is a function block diagram of a scanner according to the present invention.

The processor (20) controls the operation of the scanner. The Contact Image Sensors (CIS) (21) comprise a linear array of detectors, covered by a focusing lens and flanked by LEDs for illumination. The CIS converts a line of the scanned document into an analog signal. An analog/digital converter (22) converts the analog signal into digital values. An image compressor (23) produces a JPEG compressed image. This image is saved on the external memory card by means of the card memory controller (24) and memory card connector (29), or is saved on the external memory stick by means of the memory stick USB controller (25) and USB memory connector (30), or is saved on the local memory (26). The local memory can be accessed by a computer by the USB connector to host (32).

The paper is moved by a paper feeder step motor (28) controlled by a motor controller (27).

The rechargeable battery (31) provides the power for the different elements of the scanner. The battery can be charged with the USB power charge connector (32) coupled with the USB connector to host.

The scanner shown in FIG. 7 may be coupled with an OCR application residing on a computer. This OCR application converts the JPEG images into text and output the result into different formats such as HTML, RTF, WORDX, PDF, . . . .

The scanner processor determines the folder names and the file names given to the JPEG files in the local memory (or USB memory stick, or memory card). Those names have pre-determined prefixes that can be recognized later by the OCR application residing on the computer. Indeed, when the local memory (or USB memory stick, or memory card) is connected to the computer, it is automatically mounted as a standard memory device and the OCR application will search for JPEG files having the pre-determined prefixes. The OCR application can thus independently (or interactively by asking OCR settings to the user) convert the selected JPEG files into the output format.

The scanner shown in FIG. 7. could also be equipped, in alternative embodiments, with an image digital processor with functions to enhance the image quality known to the person skilled in the art such as image color correction, image de-noising, image sharpening, image cropping etc.

The scanner shown in FIG. 7 is equipped with a JPEG compressor. In alternative embodiments, the scanner could also be equipped with another image compressor known to the person skilled in the art, such as JPEG2000, JPEG XR, etc. It could also be equipped by the iHQC compressor of I.R.I.S. SA (patent application US2008273807 A1) or another document hyper-compressor intended to highly compress documents that contain text and images. It could also be equipped with a PDF or XPS image wrapper.

The scanner shown in FIG. 7 is equipped with a processor. In alternative embodiments, the scanner could also be equipped with a microcomputer (microprocessor, an Operating System, ROM and RAM) to execute embedded programs known to the person skilled in the art such as an OCR program performing text recognition and creating a searchable PDF or XPS file, a program to auto-orientate the document image, an automatic classification based on the paper size (e.g. between business card or invoice), an automatic identification (e.g. by using the Fingerprint™ technology from I.R.I.S. SA) of the document type (e.g. form types). Each document type would then be associated with a pre-determined folder prefix.

The scanner shown in FIG. 7 can also be equipped in alternative embodiments with a keyboard and display device (or other input/output device). Those devices could be used to enter or select image processing types and parameters known to the person skilled in the art, such color correction, image de-noising, image sharpening, etc. Those devices could be used to enter or select compression parameters known to the person skilled in the art, such as the type of compression, the compression quality factor.

The scanner shown in FIG. 7 could be equipped, in alternative embodiments, with a Bluetooth adapter, Wi-Fi adapter or another wireless adapter that can be used, in a manner known to the person skilled in the art, to transfer the image files from the scanner local memory, or a removable memory device connected to the scanner, to a network drive, a computer or a mobile terminal.

The scanner shown in FIG. 7 is equipped for connecting a USB stick and SD/xD/MMC/MS memory card. In alternative embodiments, the scanner could also be equipped for connecting other types of storage media known to the person skilled in the art, such as for example a portable disk storage, a Compact Flash card, a micro SD card, etc. and/or multiple storage media of the same type.

The scanner shown in FIG. 7 is equipped with a local rechargeable battery. In alternative embodiments, the scanner could also be equipped with other types of battery known to the person skilled in the art, such as for example a removable battery.

The scanner shown in FIG. 7 is equipped with a USB power charge connector. In alternative embodiments, the scanner could also be equipped with other types of power charge connector known to the person skilled in the art, such as for example a power supply port.

The scanner shown in FIG. 7 is coupled with an OCR application residing on a computer. In alternative embodiments, the scanner could also be coupled with other software applications known to the person skilled in the art, such as for example Business card recognition software, invoice recognition software, document management software, etc.

The scanner shown in FIG. 7 coupled with a software application residing on a computer may be also equipped, in alternative embodiments, with a keyboard and display device (or other input/output devices) that allow a user to enter or select pre-determined prefixes for folder names and file names. The same pre-determined prefixes can also be selected by the user in the software application so that only the JPEG files corresponding to those prefixes will be processed by the software application. Those prefixes can also be pre-determined to represent the document types (business letter, business card, invoice, form, . . . ) or document characteristics (such as for example the language). The software application will then interpret the prefixes and select the operations (with the proper settings) to be performed on the document.

The scanner shown in FIG. 7 coupled with a software application residing on a computer can also be equipped, in alternative embodiments, with a keyboard and display device (or other input/output device) that allow a user to select tags that will be inserted in the image files. Those tags can also be pre-determined to represent the document types (business letter, business card, invoice, form, . . . ) or document characteristics (such as for example the language). The software application will then interpret the tags and select the operations (with the proper settings) to be performed on the document.

Figure 8:
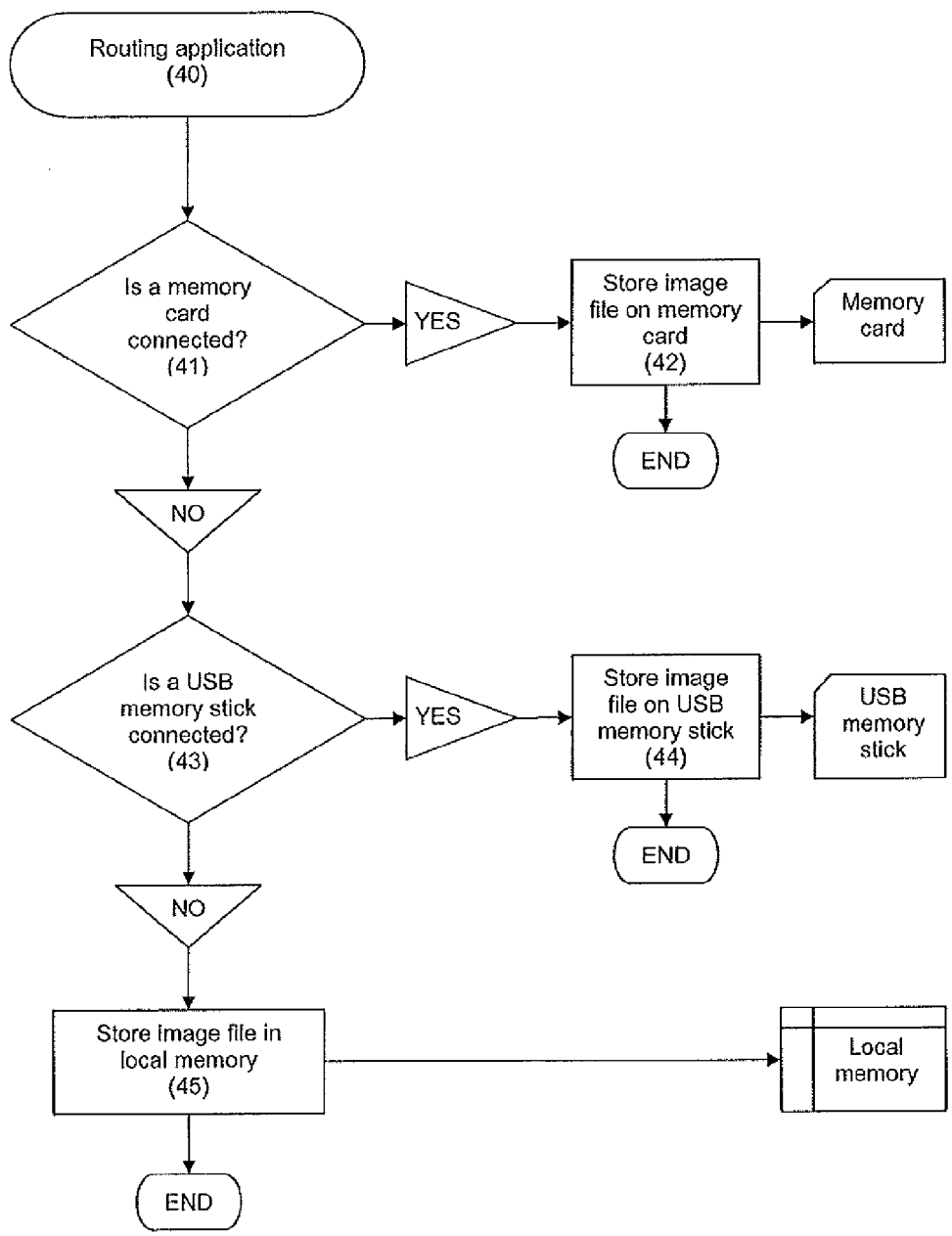
FIG. 8 shows the flowchart of the embedded routing application of embodiments of an autonomous portable scanner according to the invention.
Figure 9:
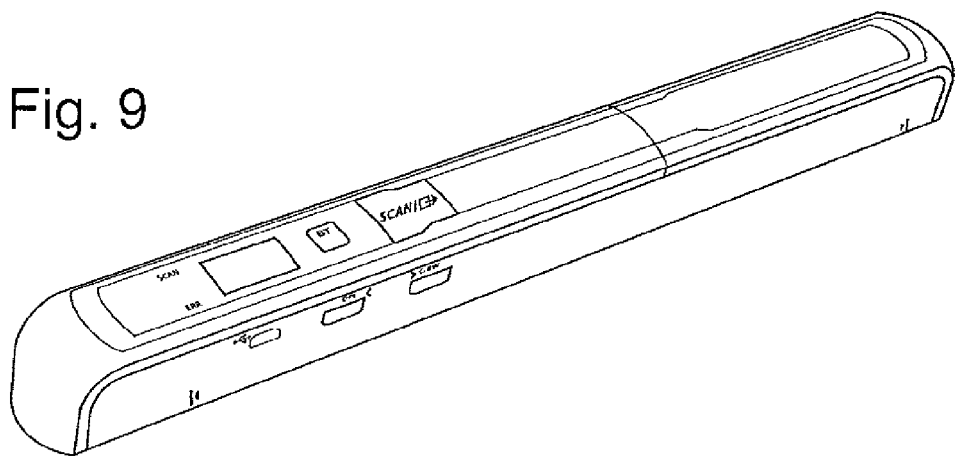
FIG. 9 shows an external view of a hand-held scanner of the present invention.

FIG. 8 shows the flowchart of the embedded routing application (40) of a scanner according to embodiments of the invention, i.e. a portable scanner such as for example a sheet-fed scanner or a hand-held scanner. The embedded routing application determines on which memory media to store a scanned image file. The application searches first for a connected memory card (41). If a connected memory card is found, the image file is stored on this memory card (42). If not, the application searches for a connected USB memory stick (43). If a connected USB memory stick is found, the image file is stored on the USB memory stick (44). If not the image file is stored in the local memory (45).

In alternative embodiments, the embedded routing application could use the result of a classification or identification program executed (described previously) on the microcomputer of the scanner to determine on which memory media to store the scanned.

With reference to FIGS. 9-19, embodiments of a hand-held scanner according to the invention will be described.

Figure 12:
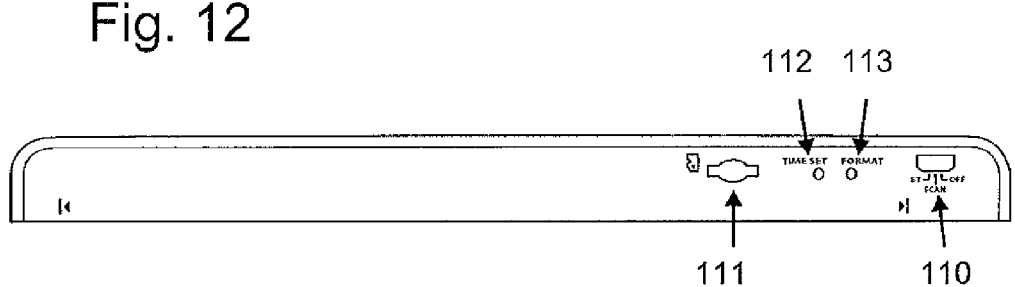
FIG. 12 shows the connections, buttons and indications on the rear side of this scanner.

The scanner has, preferably on its rear side shown in FIG. 12, a switch with three positions OFF, SCAN, BT 110. The switch has to be placed in the position SCAN in order to be powered on and permit its functioning.

Figure 10:
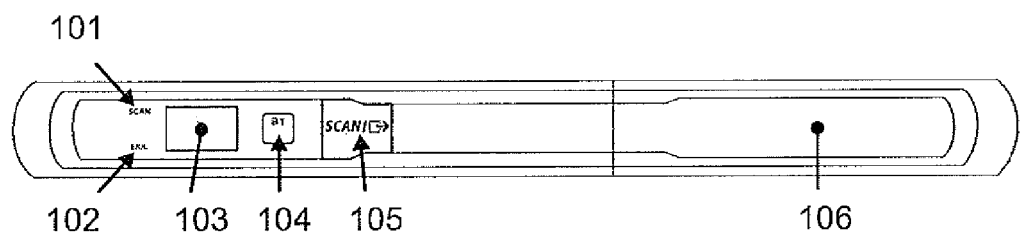
FIG. 10 shows the buttons and indications on the top side of this scanner.

The scanner further comprises, preferably on its front side shown in FIG. 10, a SCAN button 105 which the user has to press and following which the user slides the scanner gently and smoothly over the page from top to bottom. At the end of scanning the page, the user again has to press the SCAN button 105. A new image file is then stored on a micro SD card inserted in a cavity 111 of the scanner located preferably on its rear side shown in FIG. 12. During the digitalization, an indicator of the SCAN operation 101, located on the top side of the scanner (FIG. 10), is lit. If the user slides the scanner too fast over the page, an error indicator ERR 102 is lit, which is also located on the top side (FIG. 10). An LCD screen 103 on the top side of the scanner indicates the number of files stored on the micro SC card. Arrows 114 on the front side of the scanner (FIG. 11) indicate the maximum scanning width which can be covered.

Figure 14:
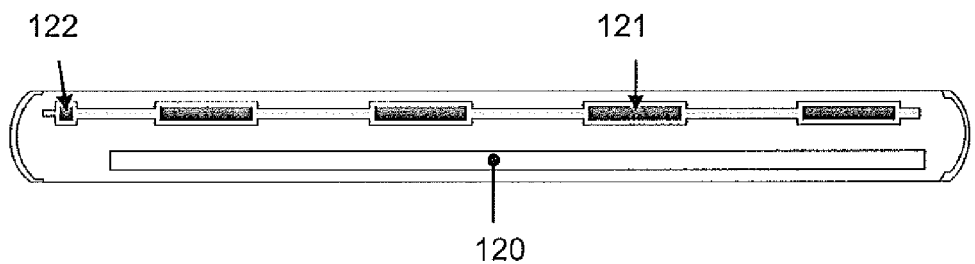
FIG. 14 shows the image sensor, mobile parts and indications on the bottom side of this scanner.

The page is scanned line by line by Contact Image Sensors (CIS) 120 located on the bottom side of the scanner (FIG. 14). The page is converted into a digital image, compressed and transmitted to a scanner internal memory.

The scanner glides along the page by means of four rollers 121 located on the bottom side of the scanner (FIG. 14) and which also drive a toothed roll 122 which is the mobile part of a displacement speed sensor. This sensor allows to equalize the length of the digital output image with respect to the length of the original page. The scanner continuously detects the speed of displacement and controls the number of lines in function of the sensed speed of displacement.

The user may scan multiple pages that may be stored in the inserted micro SC card, which may have a capacity of multiple gigabites. A capacity of 1 gigabyte allows the storage of at least 780 colour images at a resolution of 300 dpi. The LCD screen 103 shows in 118 (FIG. 13) if the SD card is almost full or if there is still plenty of space available.

The scanner can be also connected to a computer through the USB connector to host. To this end, a USB connector 107 is provided at the front side of the scanner (FIG. 3). The computer will then mount automatically the SD card of the scanner as a standard peripheral memory device (removable disk) and the image files can be accessed. Note that no specific device driver has to be installed on the computer beforehand and so the image files can be accessed by computers having different Operating Systems (Windows, Macintosh, Unix, Linux, . . . ).

The scanner can also be connected to a computer through a Bluetooth connection. To this end, the scanner first has to be paired with the computer. To do this, the switch 110 (FIG. 12) has to be placed in the position BT and the scanner has to be added as peripheral in the Bluetooth peripheral control of the computer. After the pairing, the folder containing the digitalized image files can be accessed and the image files can be moved to a desired location. An indicator "BT" 104, located on the top side of the scanner (FIG. 10) is lit when the switch 110 is located in the position BT.

The scanner can also be connected to a mobile terminal through a Bluetooth connection. To this end, the scanner first has to be paired with the mobile terminal. To do this, the switch 110 (FIG. 12) has to be placed in the position BT and the scanner has to be added as peripheral in the Bluetooth peripheral control of the mobile terminal. After the pairing, the user has to press the SCAN button 105 (FIG. 10) to initiate the image transfer. The indicator "BT" 104, located on the top side of the scanner (FIG. 10) is lit when the switch 110 is located in the position BT and blinks when the image transfer is taking place.

Figure 13:
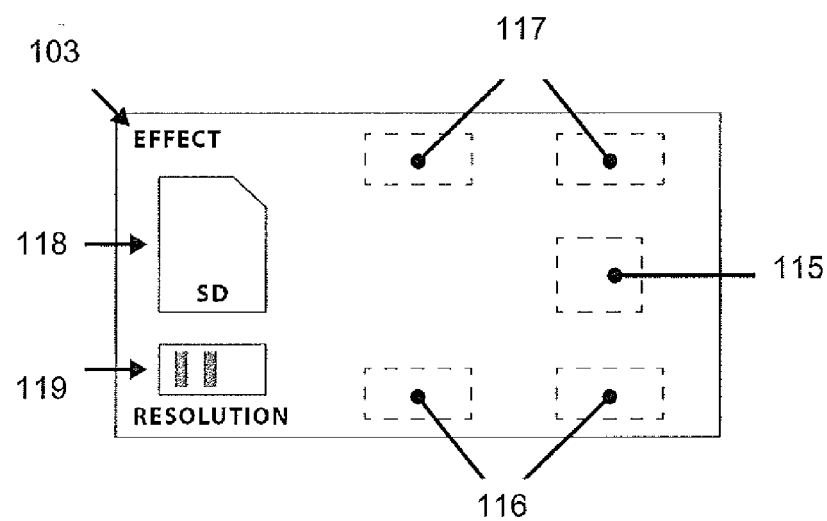
FIG. 13 shows the indications on the LCD screen on the top side of this scanner.

The scanner is equipped with a battery, located in a cavity 106, that gives the power. This battery is charged by the Power charge connector coupled with the USB connector 107 (FIG. 3) to host. The battery can have a capacity which allows to scan more than 500 A4 pages without recharging. The LCD screen 103 shows in 119 the remaining capacity of the battery (FIG. 13).

Figure 11:
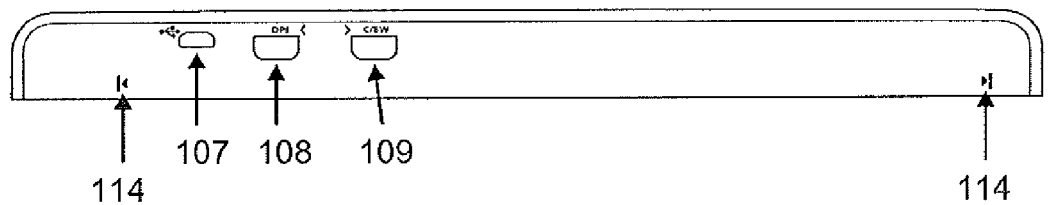
FIG. 11 shows the buttons and indications on the front side of this scanner.
Figure 15:
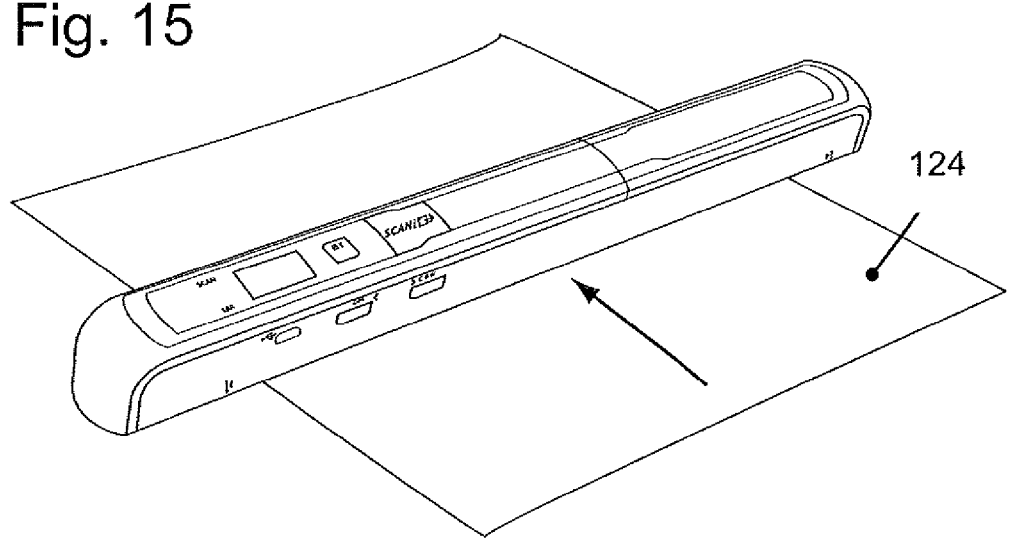
FIG. 15 shows the scanning of a document page.
Figure 16:
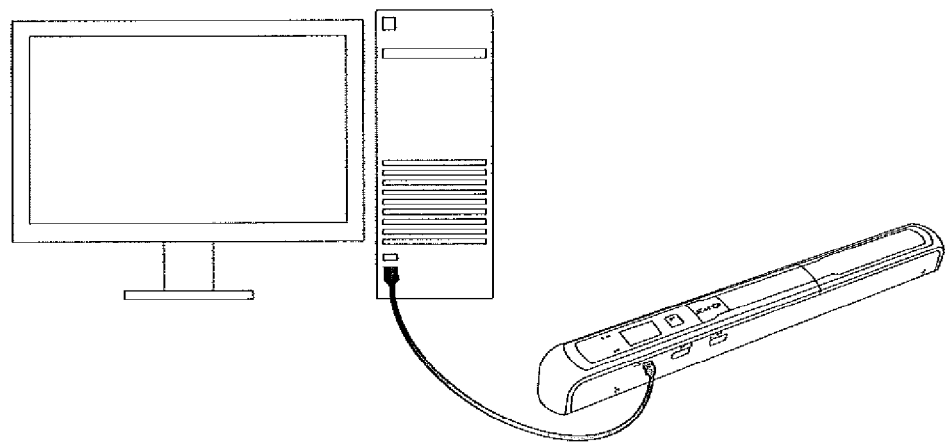
FIG. 16 shows the transmission of the scanned images stored in the scanner local memory by using an USB cable.

A DPI button 108, located on the front side of the scanner shown in FIG. 11 allows the user, when the scanner power is on, to change the scanning resolution between basic (300 dpi) and high (600 dpi). The LCD screen 103 shows the user's choice in 116 (FIG. 15). Another button C/BW 109, located on the front side of the scanner, allows the user to select between colour scanning or grayscale scanning. The LCD screen 103 shows the choice in 117.

The image files stored on the micro SC card may also be time stamped. To this end, the internal clock of the scanner has to be initialized. The date and time are initialized by pressing a specific button 112 located on the back side of the scanner (FIG. 12). The internal clock subsequently maintains the exact date and time.

Figure 18:
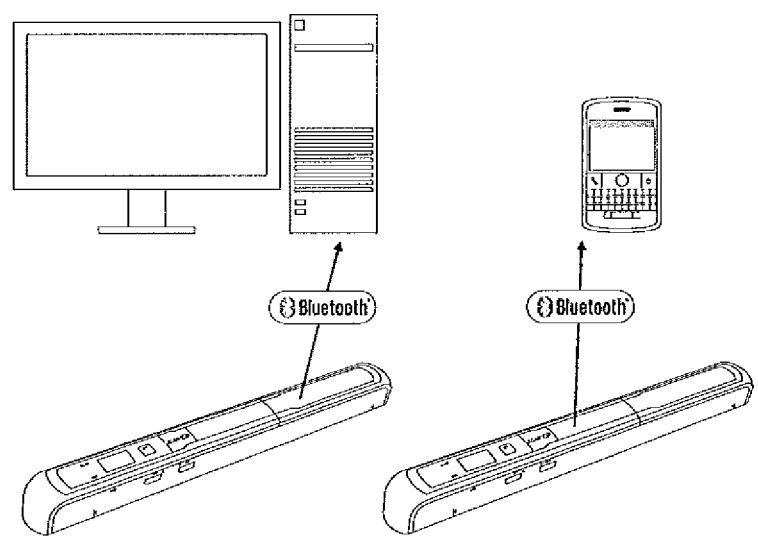
FIG. 18 shows the transmission of the scanned images by means of a wireless connection.

FIG. 15 shows the scanning of a document page 124 without a computer connected. The user may take his scanner with him while travelling and scan several documents he is interested in. Back home, he can connect his scanner to his computer and process the scanned documents by means of a USB connection (FIG. 16) or a Bluetooth connection (FIG. 18).

Figure 17:
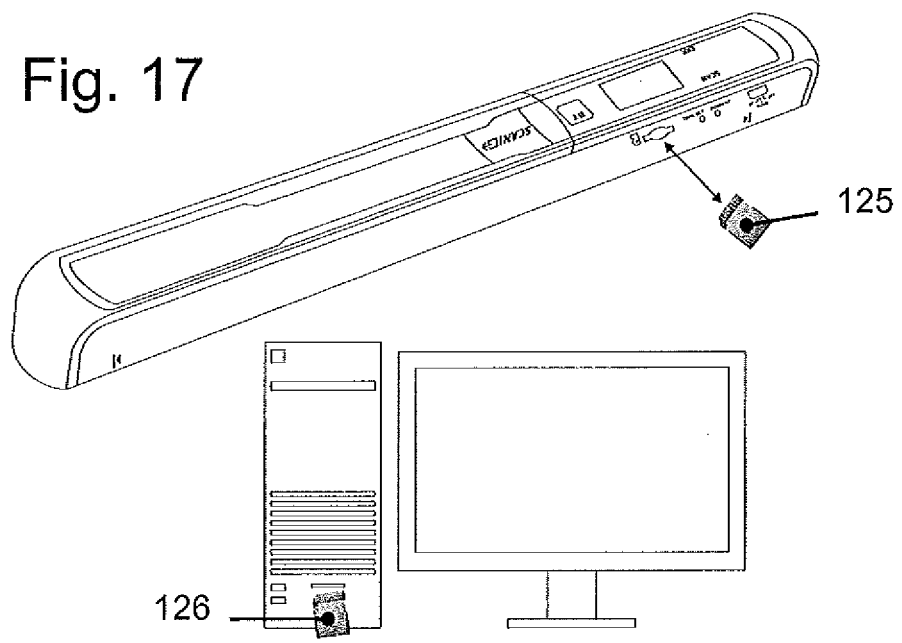
FIG. 17 shows the transfer of the scanned images by means of an SD card.

The user may also use the scanner by inserting a memory card 125 into the scanner as shown in FIG. 17. He can scan several documents and subsequently retrieve the memory card and connect it to a computer 126, which may be located elsewhere, for processing the scanned documents (FIG. 17).

Figure 19:
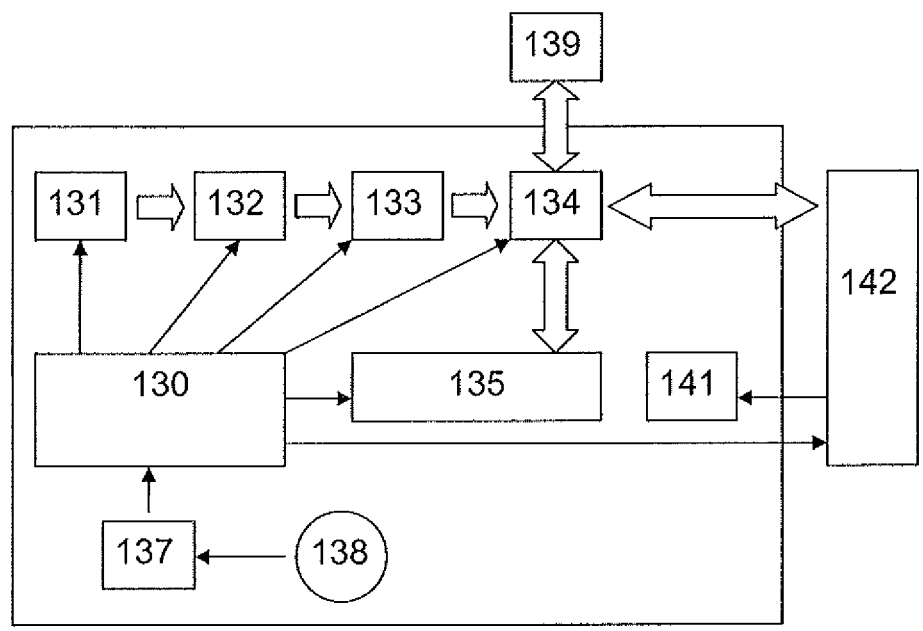
FIG. 19 shows a function block diagram of the hand-held scanner.

FIG. 19 is a function block diagram of a scanner according to an embodiment of the present invention.

A processor 130 controls the operation of the scanner. The Contact Image Sensors (CIS) 131 comprise a linear array of detectors, covered by a focusing lens and flanked by LEDs for illumination of the document. The CIS convert a line of the scanned document into an analog signal. An analog/digital converter 132 converts the analog signal into digital values. An image compressor 133 produces a JPEG compressed image. This image is saved on the external memory card by means of the card memory controller 134 and memory card connector 139. The memory card can be accessed by a computer by means of the USB connector to host 142.

The scanner and the computer, or the mobile terminal, may also communicate using the Bluetooth protocol implement on each of them by means of a protocol stack which controls the radio interface in terms of bandwidth and treats the data at a high level. To this end, the scanner comprises a device 135 equipped with a radio connected to a microprocessor. The radio is adapted to communicate with a computer or mobile terminal via the Bluetooth protocol. The radio is connected to a microprocessor on which the protocol stack is implemented and which is provided to control the transmission of signals between the scanner and the computer or mobile terminal.

The scanner which glides along the page drives the rollers and the toothed wheel, indicated with 138 in FIG. 19, which allows the displacement speed sensor 137 to estimate the speed of displacement and the processor 130 to choose the lines to keep in order to equalize the length of the output image over the length of the original page.

The rechargeable battery 141 provides the power for the different elements of the scanner. The battery can be charged with the USB power charge connector 142 coupled with the USB connector to host.

The scanner also comprises an internal clock which allows to time stamp the images stored on the micro SD card.

The scanner shown in FIG. 19 may be coupled with an OCR application residing on a computer. This OCR application converts the JPEG images into text and output the result into different formats such as HTML, RTF, WORDX, PDF, . . . .

The scanner processor 130 determines the folder names and the file names given to the JPEG files in the local memory (or USB memory stick, or memory card). Those names have pre-determined prefixes that can be recognized later by the OCR application residing on the computer. Indeed, when the local memory (or USB memory stick, or memory card) is connected to the computer, it is automatically mounted as a standard memory device and the OCR application will search for JPEG files having the pre-determined prefixes. The OCR application can thus independently (or interactively by asking OCR settings to the user) convert the selected JPEG files into the output format.

The scanner shown in FIG. 19. could also be equipped, in alternative embodiments, with an image digital processor with functions to enhance the image quality known to the person skilled in the art such as image color correction, image de-noising, image sharpening, image cropping etc.

The scanner shown in FIG. 19 is equipped with a JPEG compressor. In alternative embodiments, the scanner could also be equipped with another image compressor known to the person skilled in the art, such as JPEG2000, JPEG XR, etc. It could also be equipped by the iHQC compressor of I.R.I.S. SA (patent application US2008273807 A1) or another document hyper-compressor intended to highly compress documents that contain text and images. It could also be equipped with a PDF or XPS image wrapper.

The scanner shown in FIG. 19 is equipped with a processor. In alternative embodiments, the scanner could also be equipped with a microcomputer (comprising microprocessor, an Operating System, ROM and RAM) to execute embedded programs known to the person skilled in the art such as an OCR program performing text recognition and creating a searchable PDF or XPS file, a program to auto-orientate the document image, an automatic classification based on the paper size (e.g. between business card or invoice), an automatic identification (e.g. by using the Fingerprint™ technology from I.R.I.S. SA) of the document type (e.g. form types). Each document type would then be associated with a pre-determined folder prefix.

The scanner shown in FIG. 19 can also be equipped in alternative embodiments with a keyboard and display device (or other input/output device). Those devices could be used to enter or select image processing types and parameters known to the person skilled in the art, such as color correction, image de-noising, image sharpening, etc. Those devices could be used to enter or select compression parameters known to the person skilled in the art, such as the type of compression, the compression quality factor.

The scanner shown in FIG. 19 is equipped with a cavity destined for connecting a micro SD card. In alternative embodiments, the scanner could also be equipped for connecting other types of storage media known to the person skilled in the art.

The scanner shown in FIG. 19 is equipped with a local rechargeable battery. In alternative embodiments, the scanner could also be equipped with other types of battery known to the person skilled in the art, such as for example a removable battery.

The scanner shown in FIG. 19 is equipped with a USB power charge connector. In alternative embodiments, the scanner could also be equipped with other types of power charge connector known to the person skilled in the art, such as for example a power supply port.

The scanner shown in FIG. 19 is coupled with an OCR application residing on a computer or a mobile terminal. In alternative embodiments, the scanner could also be coupled with other software applications known to the person skilled in the art, such as for example Business card recognition software, invoice recognition software, document management software, etc.

The scanner shown in FIG. 19 coupled with a software application residing on a computer or mobile terminal may be also equipped, in alternative embodiments, with a keyboard and display device (or other input/output devices) that allow a user to enter or select pre-determined prefixes for folder names and file names. The same pre-determined prefixes can also be selected by the user in the software application so that only the JPEG files corresponding to those prefixes will be processed by the software application. Those prefixes can also be pre-determined to represent the document types (business letter, business card, invoice, form, . . . ) or document characteristics (such as for example the language). The software application will then interpret the prefixes and select the operations (with the proper settings) to be performed on the document.

The scanner shown in FIG. 19 coupled with a software application residing on a computer or mobile terminal can also be equipped, in alternative embodiments, with a keyboard and display device (or other input/output device) that allow a user to select tags that will be inserted in the image files. Those tags can also be pre-determined to represent the document types (business letter, business card, invoice, form, . . . ) or document characteristics (such as for example the language). The software application will then interpret the tags and select the operations (with the proper settings) to be performed on the document.

In an alternative embodiment, the scanner may be equipped with an external memory card, a local memory and a USB stick. In this case, FIG. 8 shows the flowchart of the embedded routing application of the scanner that determines on which memory media to store a scanned image file, as described above.

We claim:

1. Battery-powered portable scanner, comprising:
   a hand-held scanning unit for scanning documents and forming digital representations thereof, said scanning unit adapted to be manually moved over a document by a user for the scanning operation;
   a processor, communicatively connected to the scanning unit and provided for controlling the scanning operation; and
   a plurality of embedded storage capabilities which are communicatively connected to the processor and each provide a storage medium for storing the digital representations of documents upon being scanned by said scanning unit; and
   a wireless connection means, communicatively connected to the processor and provided for connecting the storage media to a terminal and for transferring the stored digital representations to the terminal, the wireless connection means comprising a wireless communication means, in particular by radio;
   wherein the processor is configured for performing the following steps in sequence:
   i) an autonomous scanning and sorting operation of the scanner without connection to said terminal, wherein said scanning unit is operated to scan at least one document and the digital representation of the scanned at least one document is sorted towards and stored in a first of said storage media, said sorting being based on user-defined rules the user-defined rules on which the sorting is based comprise a document type and/or size;
   ii) establishing a connection to said terminal, wherein said wireless connection means is operated to connect said first storage to said terminal;
   iii) transferring the stored digital representation, wherein said wireless communication means is operated for transferring the stored digital representation from said first storage medium to said terminal.

2. Battery-powered portable scanner according to claim 1, wherein the plurality of embedded storage capabilities comprises two or more of the following: an internal flash memory, one or more interfaces for connecting a peripheral storage medium, one or more wireless communication links for wirelessly communicating the digital representations towards a remote storage medium, or different folders on a single storage medium.

3. Battery-powered portable scanner according to claim 2, wherein one of the interfaces is a USB port for receiving a USB memory device.

4. Battery-powered portable scanner according to claim 2, wherein one of said interfaces is an interface for connecting a micro SD card.

5. Battery-powered portable scanner according to claim 1, wherein said wireless connection means comprises a Bluetooth transceiver.

6. Battery-powered portable scanner according to claim 1, wherein said wireless connection means comprises a wi-fi transceiver.

7. Battery-powered portable scanner according to claim 1, wherein the user-defined rules on which the sorting is based comprise a user identity.

8. Battery-powered portable scanner according to claim 1, wherein user-defined rules on which the sorting is based comprise a user-defined hierarchy among the available storage capabilities.

9. Battery-powered portable scanner according to claim 1, wherein the processor is provided with an OCR application for detecting content in the digital representations and for storing the detected content together with the digital representation.

10. Battery-powered portable scanner according to claim 9, wherein said sorting is further based on the detected content.

11. Battery-powered portable scanner according to claim 1, wherein the processor is provided for sorting the digital representations in a retraceable manner, such that afterwards the selection of where to store the digital representations is retrievable.

12. Battery-powered portable scanner according to claim 11, wherein the processor is adapted for tagging the digital representations.

13. Battery-powered portable scanner according to claim 1, wherein the processor is provided for storing preferences relating to the scanning operation.

14. Battery-powered portable scanner according to claim 1, wherein the scanner is a sheet-fed scanner comprising a sheet feeder for feeding a document past the scanning unit for the scanning operation.

15. System comprising a battery-powered portable scanner and a terminal, the scanner comprising:
- a hand-held scanning unit for scanning documents and forming digital representations thereof, said scanning unit adapted to be manually moved over a document by a user for the scanning operation;
- a processor, communicatively connected to the scanning unit and provided for controlling the scanning operation; and
- a plurality of embedded storage capabilities which are communicatively connected to the processor and each provide a storage medium for storing the digital representations of documents upon being scanned by said scanning unit; and
- a wireless connection means, communicatively connected to the processor and provided for connecting the storage media to said terminal and for transferring the stored digital representations to the terminal, the wireless connection means comprising a wireless communication means, in particular by radio;

wherein the processor is performing the following steps in sequence:
  i) an autonomous scanning and sorting operation of the scanner without connection to said terminal, wherein said scanning unit is operated to scan at least one document and the digital representation of the scanned at least one document is sorted towards and stored in a first of said storage media, said sorting being based on user-defined rules, the user-defined rules on which the sorting is based comprise a document type and/or size;
  ii) establishing a connection to said terminal, wherein said wireless connection means is operated to connect said first storage medium to said terminal;
  iii) transferring the stored digital representation, wherein said wireless communication means is operated for transferring the stored digital representation from said first storage medium to said terminal.

16. System according to claim 15, wherein the terminal has a document scanning application, the document scanning application having wake up capabilities for detecting connection of the first storage medium, containing digital representations scanned by means of the scanner, to the terminal.

* * * * *